May 7, 1935. J. O. LANGE 2,000,853
VALVE
Filed Sept. 6, 1933 2 Sheets-Sheet 1

May 7, 1935.  J. O. LANGE  2,000,853
VALVE
Filed Sept. 6, 1933    2 Sheets-Sheet 2

Witness:
R. B. Davison.

Inventor:
Joseph O. Lange

Patented May 7, 1935

2,000,853

UNITED STATES PATENT OFFICE 2,000,853

VALVE

Joseph O. Lange, Chicago, Ill., assignor to Crane Co., Chicago, Ill., a corporation of Illinois Application September 6, 1933, Serial No. 688,375

3 Claims. (Cl. 251—167)

This invention relates to valves, and more particularly to a type of valve suitable for use on a pipe line in which there is present a large percentage of fibrous materials in suspension within a carrying liquid, as for example, in the process of manufacturing paper.

It is well accepted that heretofore one of the principal objections to a gate valve in its use as a control medium on a pipe line containing such material was the fact that the closure mechanism of the valve became objectionably affected by accumulation of materials in suspension and thus prevented proper control of flow. This is principally due to the fact that the fibrous matter accumulating at the lower portion of the interior of the pipe line caused an accumulation or piling up of such materials as heavy fibrous pulp, making it difficult, if not impossible, to bring the valve disc to its seat in order to regulate the flow.

One of the objects of this invention is to provide for a construction in a valve or similar fitting in which these difficulties are obviated and the valve disc closes without appreciable opposition from the fibrous material, accomplished through use of a new shape or type of passage as hereinafter disclosed.

Another object of this invention is to provide for the uniform distribution of material around the interior periphery of the valve body, fitting, and/or the tubing so that the cross section of the material to be cut becomes relatively uniform in its section by reason of its distribution therein.

Other objects and advantages of this construction will become apparent as the specification proceeds, in which:

Fig. 3 is a reduced sectional view taken on the line 3—3 of Fig. 1, showing a cross section of the port of the valve on the downstream or outlet end.

Figure 1:
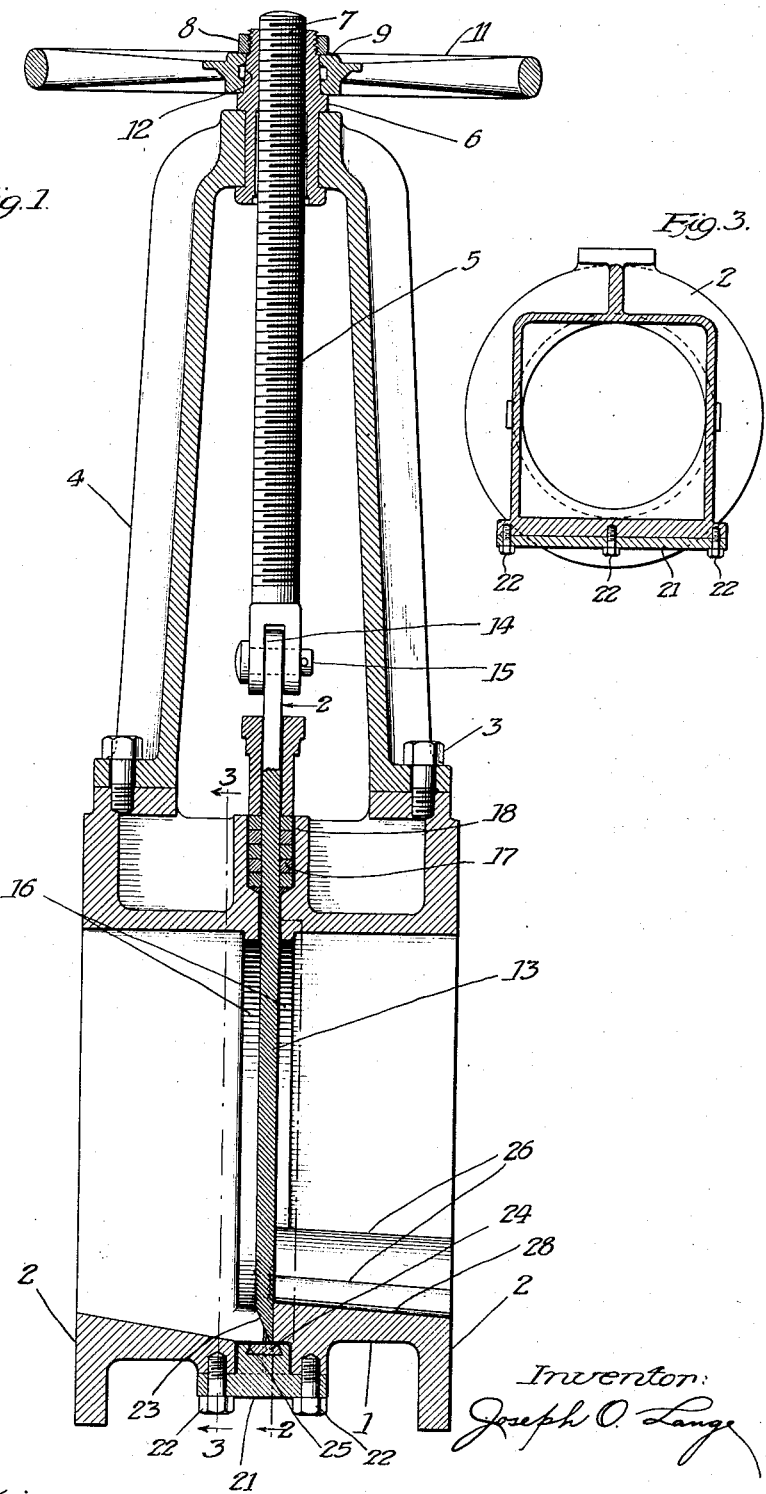
Fig. 1 is a sectional assembly view of one form of my invention.

Referring to Fig. 1, the valve consists of the usual casing 1 having the flanged end connections 2, which casing is attached by means of the bolts 3 to a valve bonnet or yoke 4, of split construction, in which a stem 5 is journalled by means of a yoke sleeve 6, the actual bearing therein using the stem threads 7. The yoke sleeve is held against axial movement by means of the yoke nut 8, bearing against the upper surface 9, of the handwheel 11.

The valve herein shown is of the rising stem type, in which by the rotation of the handwheel 11, the yoke 6 rotates because of it being non-rotatably attached to the handwheel by means of the square 12. The stem 5 which is threaded substantially for its full length, is attached to the valve closure member or disc 13, by means of the slotted connection 14, and the pins 15, from which the valve closure member is suspended.

In order to prevent line leakage past the disc closure member at the upper end of the valve casing, use preferably is made of a stuffing box 17, filled with compressible packing 18, and generally so constructed as to completely surround the valve closure member at its upper end of the valve casing 1. The guides 16 are used as a means for regulating the vertical travel of the valve closure member with reference to the valve casing 1, and hold it securely against transverse movement of line pressure.

Figure 2:
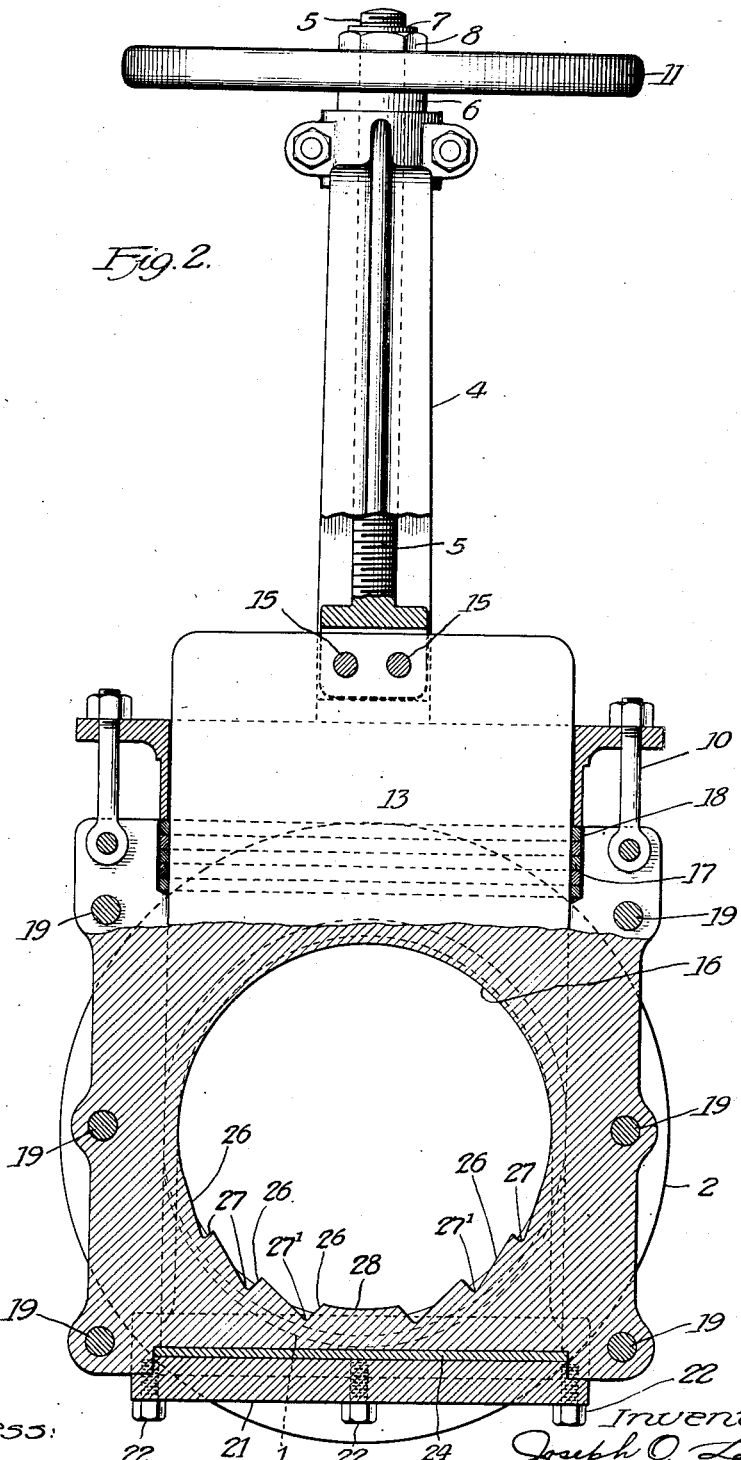
Fig. 2 is a partial sectional view taken on the line 2—2 of Fig. 1.

As more clearly shown in Fig. 2, a preferred form of my construction makes use of a split casing consisting of complementary sections joined by bolts 19 approximately on the centerline of the valve, which when assembled, forms the integral casing 1 for the movement or passage of the valve closure member.

For purpose of cleanout and also to serve as a stop for the valve closure member, a cap 21 is bolted to the lower end of the assembled casing by means of the bolts 22. The disc or closure member 13 is preferably provided with a relatively sharp, knife-like edge 23 for the purpose of cutting through the fibrous matter carried in the line fluid during the operation of closing the valve. To prevent this knife edge from becoming objectionably dulled or battered when the valve closure member reaches the end of its travel in the closing direction, a relatively soft metal stop 24, such as lead, is imbedded in the upper face of the cap 21 as shown by the groove 25, and which metal stop extends preferably across the casing for the full length of the knife edge.

In now reverting more specifically to the practical application of my invention, the valve casing 1, preferably on its upstream side, is provided within its inlet port with a step or serrated arrangement 26, the purpose of which is to hold the fibrous material within the ledges 27 and 27¹, in addition to that normally flowing over the surface 28. Ordinarily an objectionable amount of such fibrous material is likely to accumulate, due to its sliding down the curved walls of the cylindrically formed passage as ordinarily made in a valve or fitting.

However, with the serrated or step arrangement within the passage such tendency is minimized considerably, and therefore, in closing the valve, as the knife-edged closure member descends downwardly toward its seat it will first meet a considerable portion of the fibrous material lodged within the upper ledges 27 and as it continues to move downwardly, the knife edge of the disc will meet the material lodged within the ledge 27¹, which being held against lateral movement permits the knife edge to cut through the material in a gradual manner instead of encountering a heavy accumulation which would ordinarily form at the bottom surface 28. It is obvious that the number and shape of the ledges 27 and 27¹ may vary with the size, shape and service of the valve or fitting passage, and further it may be desirable to use the form of serrated or step arrangement in the passage of fittings, headers, or other pressure containing vessels.

Thus, the specifications and drawings have been merely prepared in an illustrative and not in a limiting sense, the scope of the invention being defined in the following claims:

1. In a valve, comprising a casing, a closure member therefor, an inlet to said closure member, said inlet being provided with peripherally arranged serrations extending longitudinally to the seating surface of said closure member.

2. In a valve, comprising a casing, a passage extending therethrough, a closure member intercepting said passage, the said passage having peripherally arranged serrations extending from one of its extremities to the seating surface of said closure member.

3. In a valve, comprising a casing, said casing comprising complementary sections having a passage common to said sections, a valve closure member positioned intermediate to said sections and intercepting said passage, the latter having peripherally arranged serrations extending from one of its extremities to the seating surface of said closure member.

JOSEPH O. LANGE.